United States Patent [19]

Prochazka et al.

[11] 4,418,024
[45] Nov. 29, 1983

[54] PROCESS FOR PRODUCING OPTICALLY TRANSLUCENT CERAMIC

[75] Inventors: Svante Prochazka, Ballston Lake; Frederic J. Klug, Amsterdam, both of N.Y.

[73] Assignee: General Electric Company, Schenectady, N.Y.

[21] Appl. No.: 381,820

[22] Filed: May 25, 1982

[51] Int. Cl.³ .................. B29D 11/00; C04B 35/18
[52] U.S. Cl. ........................ 264/1.2; 264/63; 264/65; 264/66; 264/325; 264/332; 264/345; 423/327; 501/12; 501/128; 501/153; 501/154
[58] Field of Search .............. 501/12, 128, 153, 154; 423/327; 264/1.2, 325, 332, 65, 63

[56] References Cited

U.S. PATENT DOCUMENTS 3,989,783 11/1976 McGee et al. ................ 264/56
4,101,615 7/1978 Horikiri et al. ............... 264/65
4,266,978 5/1981 Prochazka ................... 264/1.1

OTHER PUBLICATIONS

B. E. Yoldas, "Microstructure of Monolithic Materials Formed by Heat Treatment of Chemically Polymerized Precursors in the Al₂O₃—SiO₂ Binary", vol. 59, No. 4, pp. 479–483 (1980).

"Advanced Optical Ceramics, Phase II", Book 1 of 2, ONR Contract No. N00014-78-C-0466 (DIN: 80SDR2172) General Electric Co., pp. 1–14 and 21–42 (Aug. 31, 1980).

"Program Review–Advanced Optical Ceramics–Phase II, Government/Industry Briefing", ONR Contract No. N00014-78-C-0466, DARPA Order No. 3387, General Electric Company, p. C-9 (May 8–9, 1980).

K. S. Mazdiyasni & L. M. Brown, "Synthesis and Mechanical Properties of Stoichiometric Aluminum Silicate (Mullite)", vol. 55, No. 11, pp. 548–552, (Nov. 1972).

Primary Examiner—Helen M. McCarthy
Attorney, Agent, or Firm—Jane M. Binkowski; James C. Davis, Jr.; James Magee, Jr.

[57] ABSTRACT

Amorphous mixed oxide powder composed of from about 74 weight % to about 76.5 weight % $Al_2O_3$ balance $SiO_2$ is pressed into a compact with a density of at least 1 g/cc, fired in oxygen or vacuum of 0.05 to 1 torr producing a gas-impermeable compact, and sintered in air, argon, helium, nitrogen or mixtures thereof producing an optically translucent theoretically dense body of mullite.

4 Claims, 4 Drawing Figures

PROCESS FOR PRODUCING OPTICALLY TRANSLUCENT CERAMIC

The Government has rights in this invention pursuant to Contract N00014-80-C-0964 awarded by the Department of the Navy.

This invention relates to sintering of compacted amorphous aluminum silicate compositions that transform to mullite in an advanced stage of densification and continue to densify thereafter into an optically translucent theoretically dense ceramic.

Mullite, a crystalline aluminum silicate phase of composition $3Al_2O_3.2SiO_2$ or close to $3Al_2O_3.2SiO_2$, is a common mineral constituting silicate ceramics (whiteware, fire clay, etc.). Recent phase diagrams report 71.5 to 74 weight % $Al_2O_3$ as the compositional band for mullite crystallized in the solid state.

Mullite has been studied extensively, however its porefree, translucent polycrystalline forms were reported only by Mazdyiasni and Brown (1972) and Yoldas (1978). Specifically, Mazdiyasni and Brown, "Synthesis and Mechanical Properties of Stoichiometric Aluminum Silicate (Mullite)", *Journal of the American Ceramic Society*, Vol. 55, No. 11, pages 548–552 (Nov. 1972) disclose alkoxy-derived submicron aluminum silicate ($3Al_2O_3.2SiO_2$), specifically 71.8 wt % $Al_2O_3/28.2$ wt % $SiO_2$, with acicular, needlelike morphology can be vacuum-hot-pressed into highly dense, translucent polycrystalline bodies of stoichiometric mullite, and that the resulting compacts had a fine-grained microstructure consisting of needlelike interlocking grains arranged in an overall "jigsaw" pattern.

Yoldas, "Microstructure of Monolithic Materials Formed by Heat Treatment of Chemically Polymerized Precursors in the $Al_2O_3$-$SiO_2$ Binary", *Ceramic Bulletin*, Vol. 59, No. 4, pages 479-483 (1980) discloses that transparent gel materials were prepared in the $Al_2O_3$-$SiO_2$ binary at low temperatures by a technique that allows polymerization of aluminum and silicon through oxygen bridges at room temperature, specifically by reacting an aluminum hydrosol with silicon tetraethoxide, and that when these gel materials were heated, he observed that the composition 63 wt % $Al_2O_3$-37% $SiO_2$ had a unique capacity to remain transparent at high temperatures, i.e., 1400° C., where other materials turned opaque.

No reports are known of translucent theoretically dense polycrystalline mullite prepared by a sintering process.

In pure form mullite would be interesting as an optical material for its low thermal expansion, high melting point, chemical stability and absence of absorption bands in the visible spectrum.

According to the present invention, an optically translucent polycrystalline mullite ceramic is produced by pressing a mixed oxide powder with certain characteristics into a compact with a minimum density of 1.0 gram/cc, firing the compact in an atmosphere of oxygen or in a vacuum of about 0.05 to 1.0 torr to produce a gas-impermeable compact and sintering the gas-impermeable compact in air, argon, helium, nitrogen and mixtures thereof.

Briefly stated, the present optically translucent mullite product is produced by a process comprising providing an amorphous shapeless mixed oxide powder comprised of from about 74 weight % to about 76.5 weight % $Al_2O_3$ balance $SiO_2$ which contains no significant amount of contaminants, said powder being pressable at about room temperature into a compact having a minimum density of 1.0 g/cc, pressing said powder into a compact having a minimum density of 1.0 g/cc, firing the compact at a temperature which has no significant deleterious effect on it in oxygen or in a vacuum ranging from about 0.05 torr to about 1 torr producing a gas-impermeable compact, and sintering said gas-impermeable compact in an atmosphere selected from the group consisting of air, argon, helium, nitrogen and mixtures thereof, at a temperature ranging from about 1700° C. to about 1850° C. producing an optically translucent sintered body of theoretical density based on the density of 3.16 g/cc±0.01 or 3.17 g/cc±0.01 for said mullite product.

By a shapeless powder it is meant herein a powder with no regular or distinguishing shape or form on a microscopic scale. By a fluffy powder it is meant herein a powder which is like fluff, i.e. it is loose and soft. The present powder is characterized by a low bulk density which ranges from about 0.2 g/cc to about 0.3 g/cc at about room temperature. By room temperature it is meant herein 25° C.

The product of the present invention is an optically translucent polycrystalline body of mullite composed of from about 74 weight % to about 76.5 weight % of $Al_2O_3$ balance $SiO_2$. Its microstructure depends on its composition and on sintering temperature.

By an optically translucent polycrystalline product or body it is meant herein a body through which light or radiation in the visible wave length is able to pass through sufficiently to make such body useful for optical applications such as enclosures for arc tubes.

Those skilled in the art will gain a further and better understanding of the present invention from the detailed description set forth below, considered in conjunction with the figures accompanying and forming a part of the specification, in which.

Figure 3:
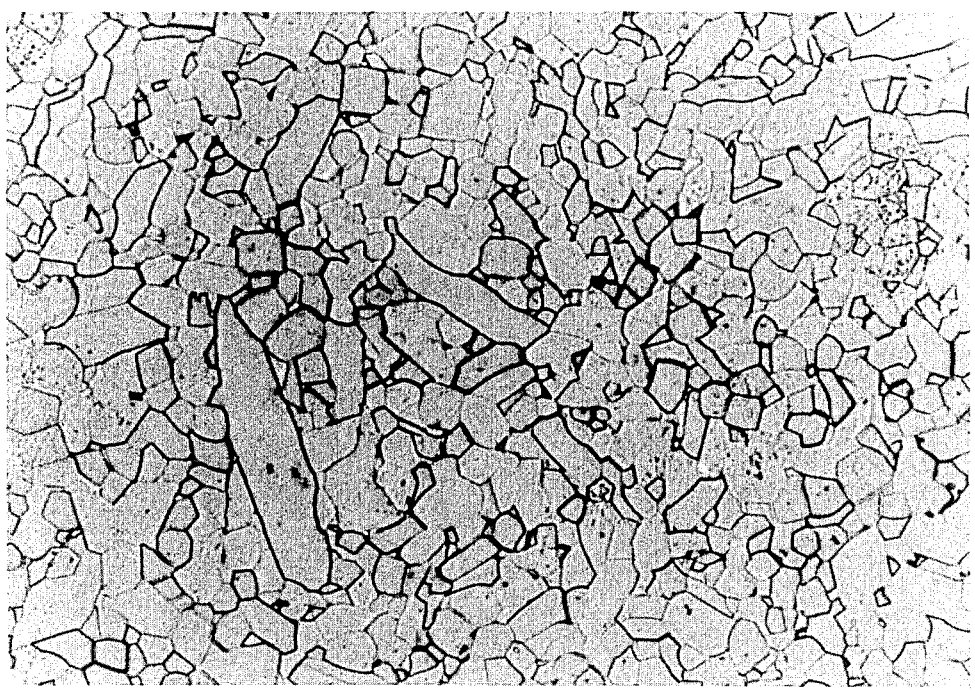
Figure 4:
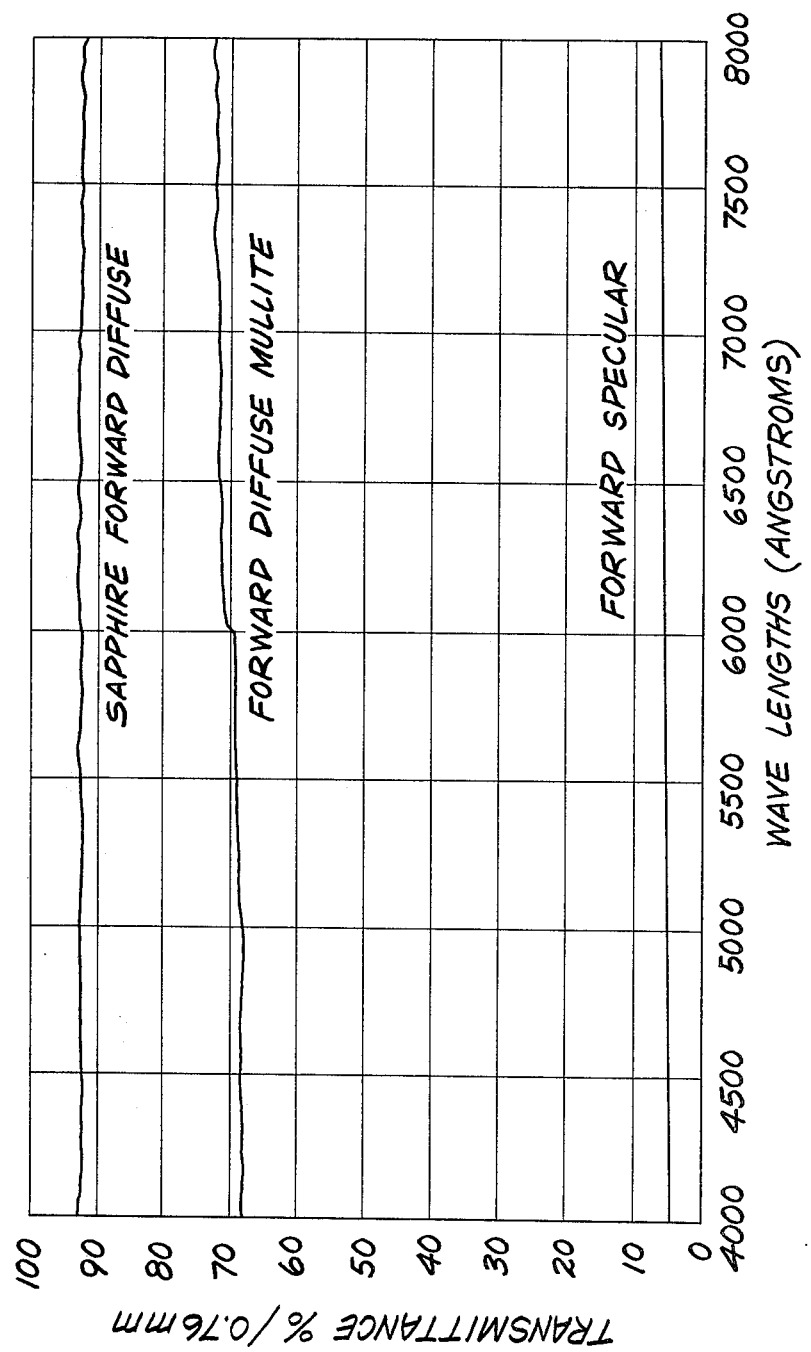

FIG. 3 is a photomicrograph (magnified 750X) showing a section of the microstructure of a polished and etched sintered disc of 74 wt % $Al_2O_3$/balance $SiO_2$ produced in accordance with the present invention by firing in $O_2$ at 1650° C. followed by sintering in air at 1800° C. for three hours producing an optically translucent body; and FIG. 4 shows graphs illustrating the optical translucency of the present product in the visible wave length range from blue to red.

The present starting mixed oxide powder is prepared from a homogeneous gel composed of hydrolyzed precursors of $Al_2O_3$ and $SiO_2$. The precursors can be organic or inorganic and are used in amounts which produce the present mixed oxide composition, i.e. the present aluminosilicate composition. This gel is produced, i.e. precipitated, in a known manner through hydrolysis of a solution of organic or inorganic precursors for $Al_2O_3$ and $SiO_2$. Depending largely on the starting materials, a peptizing agent such as nitric acid may be added to the solution to promote conversion to a gel.

For example, the gel can be prepared by hydrolysis of alkyloxides of silicon and aluminum. For example, the gel can be produced by dissolving aluminum isopropoxide and ethylmetasilicate in cyclohexane, and hydrolysis of the solution carried out by an addition of the theoretical amount of water (required to completely hydrolyze the alkyloxides) preferably dissolved in tertiary butyl alcohol to prevent separation of water into another phase during hydrolization. The water should be thoroughly admixed with the solution, preferably at about room temperature, to obtain substantially complete hydrolysis.

In a preferred technique, aluminum monohydrate is dispersed in water with a pH adjusted by nitric acid or other acid to a pH of about 4 by intensive agitation to obtain a colloidal dispersion. It is preferred but not essential that the colloidal dispersion be separated from the non-dispersible residue by screening through fine sieves or by centrifugation. The resulting colloidal dispersion of monohydrate is analyzed for its total $Al_2O_3$ content, and then mixed, for example, with ethylsilicate, in a ratio which produces the present ratio of 74 weight % to 76.5 weight % $Al_2O_3$ balance $SiO_2$. The mixture should be stirred, preferably at about room temperature, to complete hydrolysis producing the present gel product.

The present gel can be organic or inorganic and it always contains water. Preferably, if possible, the gel is thickened by filtration before it is dried to produce the present amorphous fluffy powder.

The present gel must be dried in a manner which produces the present starting amorphous fluffy powder. Specifically, drying of the gel must be carried out to remove water therefrom without collapsing it into dense particles. The present gel cannot be dried by removing its water content in liquid form since such removal collapses the gel into dense particles. Therefore, simple evaporation at room temperature or elevated temperatures cannot be applied as it results in shrinkage and formation of a strong particulate substance.

The gel can be freeze dried to produce the present starting powder. Generally, this comprises freezing the gel and subliming off its water content under vacuum. Freeze drying is not applicable to gels containing alcohols with low freezing points as these alcohols suppress the freezing point.

Alternatively, the gel can be dried by replacing its water content with a non-aqueous solvent producing a non-aqueous gel which can be dried in several ways to produce the present starting powder. Specifically, this is an exhange of solvents procedure and is applicable if the gel can be filtered. The filtered gel is then diluted with methanol, filtered, and the resulting gel further washed with methanol to displace all water and finally methanol is washed away with acetone. The resulting non-aqueous gel can be dried in air at room temperature to produce the present starting powder.

Alternatively the gel can be dried by removal of the water under supercritical conditions to produce the present powder. This can be carried out by transferring the gel into an autoclave and heating it above the critical point of water, which is above 374° C. at a pressure of 3184 psi. At this temperature the water disappears and vapor is slowly vented from the autoclave. The product is the present powder or a very friable lumpy material which is easily broken down to the present powder.

The starting aluminum silicate powder is an amorphous powder of finely dispersed oxides composed of from about 74 weight % to about 76.5 weight % $Al_2O_3$ balance $SiO_2$. Depending largely on its specific method of preparation, it contains a significant amount of water and usually, a significant amount of organic material. This powder is white, fluffy, free-flowing and shapeless with a surface area, according to low temperature nitrogen adsorption techniques, ranging from about 100 square meters per gram to about 400 square meters per gram, and preferably from about 200 square meters per gram to about 300 square meters per gram. This powder also has a low bulk density which ranges from about 0.2 g/cc to about 0.3 g/cc at about room temperature. No water should be added to this powder since the addition of water to it would shrink and collapse it into dense particles on subsequent drying.

The starting powder is calcined in air at atmospheric pressure at a temperature ranging from about 490° C. to about 1100° C., preferably from about 500° C. to 700° C., to remove water and organic material therefrom leaving no significant amount thereof. A calcining temperature below 490° C. may not remove its organic content. A calcining temperature above about 900° C. tends to aggregate the powder lightly but such calcined powder can be dry milled to break down the aggregates and dry screened without affecting its morphology significantly. Temperatures above about 1100° C. are not useful since they cause significant formation of hard aggregates. Calcining time is determinable empirically, for example, by weight loss. Calcining is completed when there is no more weight loss on further firing. Because heat transmission in this powder is very low, firing time can be as long as 10 hours. This calcining has no significant deleterious effect on the powder or its $Al_2O_3/SiO_2$ composition. Specifically, this calcining does not affect the oxide composition or morphology of the powder in any significant manner.

The calcined powder is amorphous, shapeless, fluffy and free-flowing and contains no significant amount of contaminants. It is a finely dispersed mixed oxide composed of from about 74 weight % to about 76.5 weight % $Al_2O_3$ balance $SiO_2$. It has a surface area, according to low temperature nitrogen adsorption techniques, ranging from about 100 square meters per gram to about 400 square meters per gram, and preferably from about 200 square meters per gram to about 300 square meters per gram. This powder also has a low bulk density which ranges from about 0.2 g/cc to about 0.3 g/cc at about room temperature. The calcined powder must be pressable at or about room temperature, i.e. about 25° C., into a compact with a minimum density of 1 gram/cc. No water should be added to the calcined powder since the addition of water to it would shrink and collapse it into dense particles on subsequent drying. In the present invention, a mixed oxide powder outside the present composition does not produce the present optically translucent body.

The calcined powder is pressed to produce a compact, i.e. a green compact, having a density of at least 1.0 gram/cc, and preferably higher than about 1.0 gram/cc to as high as possible, which usually is about 1.6 gram/cc. A green pressed compact with a density lower than 1.0 gram/cc will not produce the present optically translucent product. A minimum applied pressure of about 10,000 psi may produce the present pressed compact, but typically the applied pressure is at least about 30,000 psi. The applied pressure can range to as high as possible which usually is about 100,000 psi. No additives or additions should be made to the powder. The powder preferably is pressed at about room temperature, i.e. about 25° C., or ambient temperature. There is no advantage in using a temperature other than about room or ambient temperature.

The calcined powder is pressed into a compact by means which have no significant deleterious effect thereon. Specifically, the pressing means should not contaminate the powder. The powder can be die-pressed or isostatically pressed. Preferably, a steel die is used in die-pressing.

The compact can vary widely in form and size. It can be of simple, hollow or of geometrically complex shape. The present pressed compact having a density of at least 1.0 gram/cc has sufficient strength for handling purposes. For example, the present pressed compact in the form of a hollow tube having a wall thickness of 20 mils was sufficiently strong for handling purposes.

If desired, the green pressed compact may be prefired to impart additional strength to it allowing it to be more easily machined. Generally, prefiring temperature to add strength to the compact ranges up to about 1650° C. The particular prefiring temperature and prefiring time are determinable empirically and should have no significant deleterious effect on the compact. If such prefiring is carried out at a temperature at which the pores of the compact remain open, and ordinarily closure of the pores in the compact is initiated at about 1500° C., then this prefiring to add strength to the compact can be carried out at atmospheric pressure in air, argon, helium, nitrogen, oxygen and mixtures thereof, as well as in a partial vacuum provided such partial vacuum does not significantly vaporize the $SiO_2$ component of the compact. However, at a prefiring temperature at which pore closure in the compact occurs, i.e. at temperatures ranging from about 1500° C. to about 1675° C., such prefiring must be carried out in oxygen or in a partial vacuum ranging from about 0.05 torr to about 1 torr.

In the present process, the green pressed or prefired compact is then fired at a temperature ranging from about 1500° C. to about 1675° C., and preferably about 1600° C. to about 1650° C., to produce a compact impermeable to gas, i.e. a closed pore compact impermeable to gas. Such firing must be carried out in oxygen preferably at atmospheric pressure or in a vacuum ranging from about 0.05 torr to about 1.0 torr. The particular firing temperature and firing time are determinable empirically and should have no significant deleterious effect on the compact. Since at the firing temperature of about 1500° C. and higher, pores of the compact are being disconnected from its surface, the furnace atmosphere has to be pure oxygen or a vacuum ranging from about 0.05 torr to about 1 torr. Other gases, such as nitrogen, argon or carbon dioxide, when present in the firing atmosphere during pore closure in the compact, would be entrapped in the pores and would inhibit pore removal during sintering. Only oxygen is transported through crystalline mullite at a high enough rate not to interfere with the present process, and therefore, only an oxygen furnace atmosphere can be applied when firing through the interval of pore closure. Similarly, a vacuum lower than about 1.0 torr, i.e. where the pressure of the atmosphere is greater than about 1.0 torr, if gases other than oxygen are present, may introduce significant amounts of these gases into the pores and adversely limit the translucency of the sintered product. However, a vacuum higher than about 0.05 torr may vaporize the $SiO_2$ component of the compact.

A firing temperature lower than about 1500° C. is inoperable to close, i.e. disconnect, the pores of the compact. A firing temperature higher than about 1675° C. in a vacuum ranging from about 0.05 torr to about 1.0 torr would vaporize $SiO_2$ from the compact. A firing temperature higher than about 1675° C. in an oxygen atmosphere would require a high temperature oxygen furnace and such furnaces are not readily available on an industrial scale. However, a firing or sintering temperature up to about 1850° C. can be used in an oxygen atmosphere.

The rate of heating to firing temperature depends to a large extent on the extent of any impurities in the compact. The rate of heating should be such so as to eliminate any impurities from the compact before it reaches a temperature which locks these impurities in. Generally, the compact is heated to firing temperature at rates which range up to about 300° C. per hour. Higher heating rates may produce bloating of the body due to volatiles which did not escape earlier.

The fired closed pore compact need only be impermeable to gas. Such impermeability can be determined by a number of techniques. For example, it can be determined by suspending the compact and immersing it in water or other liquid and determining whether the thus-suspended-immersed compact shows any observable weight gain. Preferably, this is carried out by weighing the compact dry, submerging the compact in boiling water, letting the water cool to room temperature, recovering the compact from the water, and reweighing it to determine any weight gain. If no weight gain is observed, then the compact will have attained closed porosity, and thereby is gas impermeable.

The gas impermeable compact is sintered in an atmosphere which has no significantly deleterious effect on it, and such an atmosphere is selected from the group consisting of air, argon, helium, nitrogen and mixtures thereof. In the present process, the sintering atmosphere is a stagnant or a flowing atmosphere. The sintering atmosphere is at atmospheric or about atmospheric pressure.

In the present process, there is no significant loss of $Al_2O_3$ or $SiO_2$. When sintering is carried out in argon, helium or nitrogen, the compact must be confined during sintering to suppress loss of $SiO_2$ from its surface. Such confinement can be carried out, for example, by covering the compact completely with mullite powder, or by placing it in a covered alumina crucible.

The present sintering temperature ranges from about 1700° C. to about 1850° C. and depends to some extent on the $Al_2O_3$ content of the body and should not have a significantly deleterious effect thereon. Specifically, for a body containing 74 weight % $Al_2O_3$, sintering temperatures significantly higher than about 1800° C. may form 1% or higher volume fraction of glass phase. Formation of glass phase decreases with increasing $Al_2O_3$ content, and temperatures up to about 1850° C. have no significant deleterious effect on bodies containing from about 74.5 to about 76.5 weight % $Al_2O_3$. Sintering temperatures lower than about 1700° C. do not produce the present optically translucent body. On the other hand, temperatures higher than 1850° C. produce a sintered body with grains that are too large thereby rendering it with poor strength. Also, temperatures above 1850° C. bring about reduction of transmission as a result of the formation of a glass phase. Moreover such temperatures are close to the melting point of mullite.

The particular sintering time period depends largely on the sintering temperature and is determinable empirically with increasing sintering temperature requiring less sintering time. For example, however, a sintering temperature of about 1800° C. may have a sintering time period ranging from about 1 hour to about 10 hours.

The present optically translucent body is comprised of an aluminosilicate composed of from about 74% by weight to about 76.5% by weight $Al_2O_3$ balance $SiO_2$. Its composition is determinable by a number of techniques including wet chemical analysis, X-ray fluorescent analysis, mass spectroscopy and electron beam microanalyses.

The microstructure of the present optically translucent polycrystalline sintered body may vary somewhat depending on its composition and on sintering temperature. In the present sintering temperature range of about 1700° C. to about 1850° C. and a composition composed of about 74.5 weight % to about 76.5 weight % $Al_2O_3$/balance $SiO_2$, as well as in the sintering temperature range of about 1700° C. up to about 1800° C. and a composition of about 74 weight % to about 74.5 weight % $Al_2O_3$/balance $SiO_2$, the resulting optically translucent body has a uniform or substantially uniform microstructure comprised of equiaxed or substantially equiaxed grains with an average grain size ranging from about 8 microns to about 50 microns. An average grain size less than about 8 microns usually renders the sintered body with poor optical properties. On the other hand, an average grain size higher than about 50 microns renders the sintered body with poor strength largely due to microcracking. Preferably, for best optical translucency and strength, the present sintered body has an average grain size ranging from about 12 microns to about 35 microns. The grain size of the optically translucent product depends largely on sintering temperature and sintering time. The higher the sintering temperature and the longer the sintering time, the larger is the average grain size of the product.

However, the microstructure of the present optically translucent polycrystalline sintered body varies when it is produced in the sintering temperature range from about 1800° C. to 1850° C. from a compact composed of about 74 weight % up to about 74.5 weight % $Al_2O_3$/balance $SiO_2$. Specifically, with a content of 74 weight % $Al_2O_3$, the optically translucent body produced at from about 1800° C. to 1850° C. will have, or is likely to have a microstructure composed of elongated grains. As the $Al_2O_3$ content is increased from 74 weight % in this 74 weight % up to about 74.5 weight % $Al_2O_3$ range, the microstructure of the optically translucent body produced at this higher sintering range also will show equiaxed grains, and its microstructure will be composed of a combination of elongated and equiaxed grains. With a further increase in $Al_2O_3$ content, i.e. approaching 74.5 weight %, the resulting optically translucent sintered body likely will have a microstructure which is uniform or substantially uniform composed of equiaxed or substantially equiaxed grains.

The present optically translucent body ranges from one comprised of single phase to one comprised of a primary phase and secondary phase, said secondary phase ranging up to about but less than 1% by volume of the total volume of the sintered body. Such phase composition of the optically translucent body is determinable by optical microscopy. By the term single phase or primary phase it is meant herein the mullite phase. The mullite phase also is identifiable by X-ray diffraction analyses. The secondary phase should have no significant deleterious effect on the present product. The secondary phase may be $Al_2O_3$ or glass.

Ordinarily, when the $Al_2O_3$ component of the optically translucent sintered body ranges from about 74.5 weight % to about 75.5 weight %, or approaches such range, the body is composed of a single phase of mullite after sintering at from about 1800° C. to about 1850° C. However, as the $Al_2O_3$ content approaches 76 weight %, the optically translucent sintered body is likely to show a minor amount of $Al_2O_3$ precipitate as a secondary phase. The presence of the $Al_2O_3$ phase is detectable by optical microscopy X-ray diffraction analysis and by scanning electron microscopy. On the other hand, as the $Al_2O_3$ content approaches 74 weight %, the optically translucent sintered body is likely to show glass as a secondary phase. The glass phase is determinable by optical microscopy after the specimen has been metallographically prepared which includes acid-etching, and by scanning electron microscopy.

The present optically translucent sintered body is of theoretical density, i.e. it has a density of 3.16 g/cc±0.01 or 3.17 g/cc±0.01, or a 100% density based on the density of 3.16 g/cc±0.01 or 3.17 g/cc±0.01 for mullite. The specific density value can vary because it depends on the specific composition of the present mullite product. Such an optically translucent sintered body may have residual small pores but the porosity is not detectable by current liquid displacement density measurements, i.e. it is less than 0.05% by volume of the total volume of the sintered body.

The degree of transmission of radiation through the present optically translucent sintered product can also be defined by transmittance, and specifically forward diffuse transmittance, which is the ratio of the intensity of the transmitted beam and the intensity of the incident beam and refers to radiation of certain wave length and a specimen of certain thickness. These variables are related by the formula below, $$I/I_o = ke^{-\alpha d}$$

where I and $I_o$ are the intensities of the transmitted and incident beams, d the thickness of the specimen, $\alpha$ the absorption coefficient and k is a constant determinable from the refractive index of the material. In addition the cone angle of the transmitted beam has to be specified.

The present optically translucent sintered body has an average minimum forward diffuse transmittance of 70% per 0.75 millimeter thickness over the visible wave lengths ranging from 4000 Angstroms to 8000 Angstroms.

The invention is further illustrated by the following examples wherein the procedure was as follows unless otherwise stated:

Calcining was carried out in air at atmospheric pressure.

Surface area measurements were made by a low temperature nitrogen absorption technique.

Firing and sintering was carried out in a molybdenumwound resistance furnace comprised of a dense open-ended alumina tube with a ¾ inch I.D. or a 2 inch I.D.

Temperature was measured and controlled with a W 5% Re, W 26% Re thermocouple contained in a protective sapphire sheath. Temperature measurement also was performed by sighting directly on the sample with an optical pyrometer.

At the end of each sintering run, the power was switched off and the sintered body was furnace-cooled to room temperature.

The bulk density of the powder as well as each pressing or compact was determined from its weight and dimensions at room temperature.

Density of the sintered product was determined by water displacement using Archimedes method.

Sintering was carried out in a flowing atmosphere at atmospheric pressure.

Shrinkage is linear shrinkage ($\Delta L/L_o(\%)$), and it is the difference in length between the unsintered body, i.e. compact, and the sintered body, $\Delta L$, divided by the length of the compact, $L_o$. This shrinkage is an indication of the extent of densification.

Densities were obtained on the as-sintered bodies.

Phase composition of the sintered specimens was determined by standard metallographic techniques using optical microscopy.

Forward diffuse transmission measurements on sintered bodies were made using a Perkin Elmer model 330 spectrophotometer using an integrating sphere of 60 mm diameter. The body was placed reproducibly in the same position each time by butting the body against the aperture. Forward diffuse transmittance herein was determined with a cone angle of the transmitted beam from 120° to 180°.

Forward specular transmission measurements on sintered bodies were also made on the Perkin Elmer 330 spectrophotometer by using a ⅜" aperture and positioning the body in the center of the sample compartment. Forward specular transmittance herein was determined with cone angle around the transmitted beam less than 2°.

EXAMPLE 1

At room temperature aluminum secondary butoxide was admixed with ethylsilicate to form solution of desired $Al_2O_3/SiO_2$ ratio, and a number of solutions of varied ratio, i.e. 73 wt %–77 wt % $Al_2O_3$/balance $SiO_2$ were thus formed.

Each 600 gram solution was diluted with 1 liter of cyclohexane. A mixture composed of equivalent amounts of water and tertiary butyl alcohol was admixed with each solution in an amount which was calculated to provide sufficient water to completely hydrolyze it forming a dispersion of an insoluble polymeric precipitate of the $Al_2O_3/SiO_2$ ratio.

Each resulting dispersion was stirred overnight at room temperature to insure complete homogeneity and then the precipitate, i.e. gel, was filtered off. The gel was washed three times with cyclohexane to remove its alcohol content. The resulting gel was freeze-dried producing a fluffy free-flowing shapeless powder. This procedure was repeated a number of times producing a number of batches of powder.

The powders were calcined in air at temperatures ranging from 490° C.–1100° C. for firing time periods ranging from 8 hours to 20 hours to remove its water and hydrocarbon content so that no significant amount thereof remained.

The calcined powder was fluffy, free-flowing, shapeless and amorphous to X-ray diffraction analysis. The noncalcined powder, as well as the calcined powder, had a specific surface area ranging from 100 $m^2/g$ to 400 $m^2/g$, and typically 300 $m^2/g$, and it had a bulk density ranging from about 0.2 g/cc to about 0.3 g/cc.

The calcined powder was pressable in a steel die at room temperature under a pressure of about 50,000 psi into a compact having a minimum density of 1.0 g/cc.

EXAMPLE 2

Aluminum monohydrate with an average particle size of 200 Å was dispersed in water to form a colloidal dispersion. Specifically, the concentration was 1 gram of AlO(OH):8 grams of $H_2O$. The dispersion was effected by adding $HNO_3$ to obtain a pH of 3 to 4. The AlO(OH) dispersion was ball milled overnight and removed from the mill. On standing 24 hours or more a small fraction of the AlO(OH) settled from the dispersion and was removed by straining the clear solution.

The AlO(OH) dispersion was analyzed gravimetrically to determine the concentration of $Al_2O_3$ exactly. Ethyl silicate ($Si(OC_2H_5)_4$) was then added to produce a mixture of the desired $Al_2O_3/SiO_2$ ratio, and a number of mixtures of varying ratio, i.e. 69.9 wt %–79.1 wt % $Al_2O_3$/balance $SiO_2$ were thus formed.

Each mixture was vigorously stirred at room temperature for several hours until the ethyl silicate was completely hydrolyzed, and after that each mixture was placed in a high speed mixer and ammonia was added until the dispersion gelled. Typically 3 cc to 6 cc of $NH_4(OH)$ were required for each liter of dispersion.

Each resulting gel was frozen and subsequently thawed at room temperature which turned the gel into a filterable dispersion.

The gel particles were filtered off from the solution and washed with anhydrous methanol and acetone in sequence to remove all $H_2O$ from the particles prior to drying.

The resulting non-aqueous gel was dried at 200° C. in air producing the present white fluffy flowable starting powder. Usually, this powder was screened thru a 40 mesh sieve to break down or remove any aggregates.

This procedure was repeated a number of times producing a number of batches of powder.

The starting powders were calcined, i.e. fired, in air at temperatures ranging from 490° C.–1100° C. for firing time periods necessary to remove their water and hydrocarbon content so that no significant amount thereof remained.

The calcined powder was fluffy, free-flowing, shapeless and amorphous to X-ray diffraction analysis. The noncalcined powder, as well as the calcined powder, had a specific surface area ranging from 100 $m^2/g$ to 400 $m^2/g$, typically 400 $m^2/g$, and a bulk density ranging from about 0.2 g/cc to about 0.3 g/cc.

The calcined powder was pressable in a steel die at room temperature under a pressure of about 50,000 psi into a compact having a minimum density of 1.0 g/cc.

EXAMPLE 3

An aluminosilicate powder comprised of 75 wt % $Al_2O_3$/balance $SiO_2$ was prepared in the same manner as disclosed in Example 2. The powder was calcined at 600° C. in air for about 8 hours. A portion of the calcined powder was analyzed by wet chemical analysis and found to be composed of 75% by weight $Al_2O_3$ and 25% by weight $SiO_2$. Impurities determined by emission spectroscopy of the calcined powder were in %, 0.02 Na, 0.01 Fe, <0.004 Ca, 0.07 Ti.

The calcined powder was pressed at room temperature in a steel die under a pressure of 75,000 psi into one disc, one inch in diameter with a thickness of about 0.04 inch, and another disc one inch in diameter with a thickness of about 0.06 inch. Each disc had a green density of about 1.2 g/cc.

Both discs were prefired in air at atmospheric pressure at 1000° C. for 12 hours. The resulting prefired discs were embedded in and completely covered with mullite powder in an alumina crucible and fired in a vacuum of 0.05 torr for 90 minutes at 1620° C. producing gas-impermeable discs.

The resulting fired gas-impermeable discs were X-rayed. An $Al_2O_3$ second phase could be detected in each disc only at the highest sensitivity of the diffractometer and was confined to their surface regions.

One disc was cut in half. One of the half-discs was embedded in and completely covered by mullite powder and sintered in flowing argon at one atmosphere at 1800° C. for one hour. The resulting as-sintered non-polished half-disc was optically translucent and exhibited a slightly gray coloration.

The other half disc was sintered in flowing air at one atmosphere pressure at 1800° C. for 3 hours. The resulting as-sintered non-polished half-disc was optically translucent.

Both of these sintered half-discs illustrate the present invention and each would be useful as an envelope for an arc tube. Their optical translucency indicated that they were 100% dense and that the parent vacuum-fired disc was of closed porosity and impermeable to gas. When each half-disc was laid against newsprint, the print could be read by eye. Also, the optical translucency of these half discs was equivalent and could not be differentiated by the eye. In addition, their optical translucency indicated that they were composed of single phase mullite.

EXAMPLE 4

The second gas impermeable disc which had been fired in vacuum but not sintered in Example 3 was used in this example. The disc was embedded in and completely covered by mullite powder in an alumina crucible and was sintered in argon at one atmosphere at 1800° C. for one hour and then furnace-cooled to room temperature.

The as-sintered, non-polished disc was optically translucent and would be useful as an arc tube envelope. When it was laid against newspaper print, the print could be read by eye. Its optical translucency indicated that it was composed of single phase mullite, that it was 100% dense and that the parent vacuum-fired disc was of closed porosity and impermeable to gas.

Figure 1:
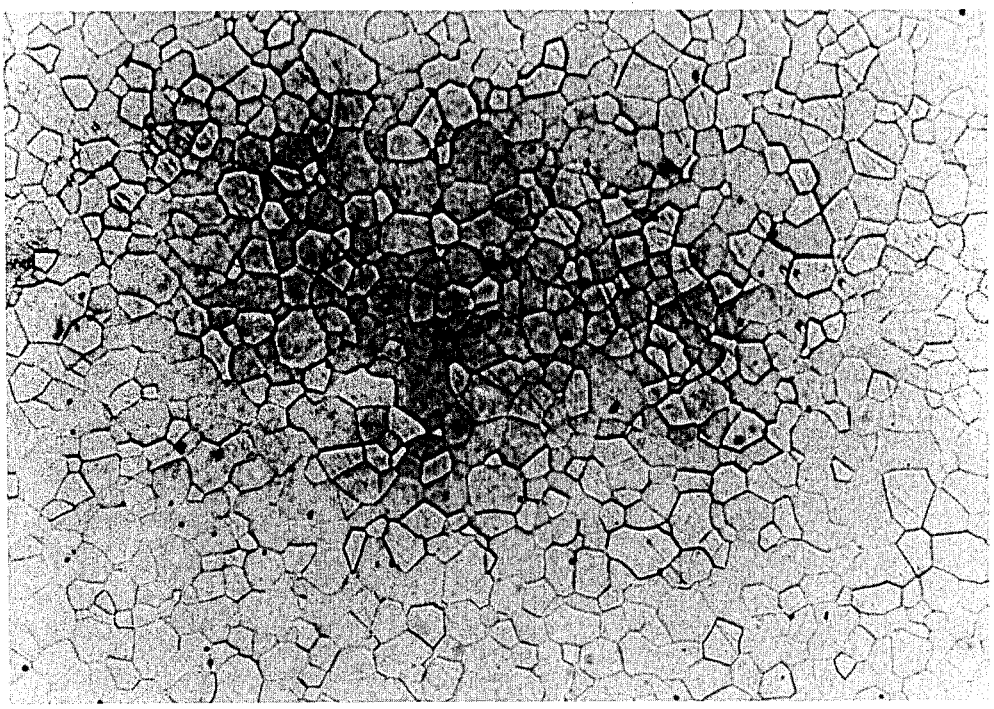
FIG. 1 is a photomicrograph (magnified 750X) showing the polished and etched section of a sintered disc 75 wt % $Al_2O_3/25$ wt % $SiO_2$ produced in accordance with the present invention by firing in a vacuum of 0.05 torr at 1620° C. producing a gas-impermeable compact and then sintering in argon at 1800° C. for one hour producing an optically translucent body.

The sintered disc was cut in half with a diamond saw. One of the half-discs was polished, etched in boiling concentrated NaOH for 10 minutes, rinsed with water and dried to reveal the grain boundaries. The cross-sectional surface of this etched half-disc is illustrated in FIG. 1 which shows a substantially uniform microstructure and substantially regular equiaxed grains having an average grain size of about nine microns as measured by mean linear intercept. In addition, FIG. 1 shows the microstructure to be composed of single phase mullite with no significant amount of second phase present. Also, a few intergranular pores, two microns or less, could be seen in the microstructure of FIG. 1.

The other half-disc was polished on both faces to a thickness of 0.76 mm. An optical transmittance scan of the visible region of the electromagnetic spectrum of the polished half-disc was made and is shown in FIG. 4. FIG. 4 shows a forward diffuse transmittance ranging from about 68% to about 72% in the visible spectrum ranging from 4000 Å to 8000 Å. FIG. 4 also shows the forward specular transmittance of this disc to be about 4% to 6%.

As a control, FIG. 4 also shows the forward diffuse transmittance obtained with sapphire of 0.76 mm thickness.

EXAMPLE 5

Aluminosilicate powder comprised of 75 wt % $Al_2O_3$/25% $SiO_2$ was prepared, calcined in air, and the calcined powder was pressed into a disc in substantially the same manner as set forth in Example 3.

The green pressed disc was one inch in diameter, about 0.040 inch thick and had a density of 1.2 g/cc.

The disc was fired in oxygen at atmospheric pressure at 1650° C. for one hour and then furnace cooled to room temperature to produce a gas impermeable body.

The fired body, which was opaque, was sintered in air at atmospheric pressure at 1800° C. for 3 hours and then furnace cooled to room temperature. The resulting sintered disc was approximately 0.075 inch in diameter and 0.030 inch thick.

The sintered disc was optically translucent and would be useful in its as-sintered non-polished condition as an arc tube envelope. When it was laid against newsprint, the print could be read by eye. Its optical translucency indicated that it was composed of single phase mullite, that it was 100% dense and that the firing in oxygen had produced a gas-impermeable body.

Figure 2:
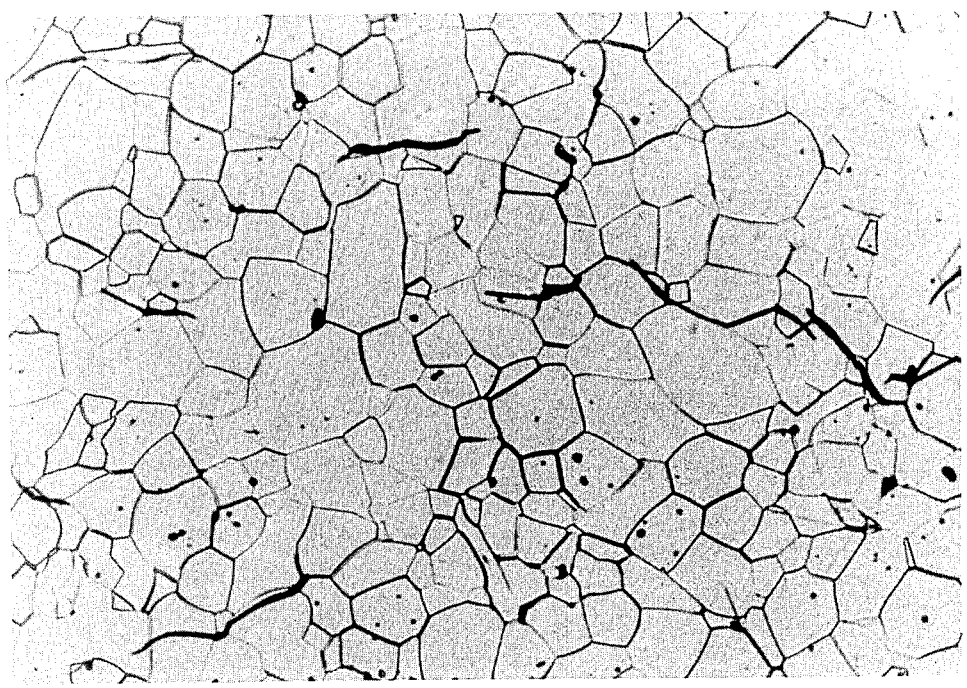
FIG. 2 is a photomicrograph (magnified 750X) showing a section of the microstructure of a polished and etched sintered disc 75 wt % $Al_2O_3/25$ wt % $SiO_2$ produced in accordance with the present invention by firing in oxygen at 1620° C. producing a gas-impermeable compact and then sintering in air at 1800° C. for three hours producing an optically translucent body.

The sintered disc was polished and etched substantially in the same manner disclosed in Example 4 to remove a substantial portion of the face of the disc to show its crosssectional microstructure. The etched surface is illustrated in FIG. 2 which shows a substantially uniform microstructure and substantially regular equiaxed grains that had an average grain size of 16μ as measured by mean linear intercept. Also, FIG. 2 shows the microstructure to be composed of single phase mullite with no significant amount of second phase present.

EXAMPLE 6

An aluminosilicate powder comprised of 74 wt % $Al_2O_3$/26 wt % $SiO_2$ was prepared, calcined in air, and the calcined powder was pressed into a disc in substantially the same manner as set forth in Example 3.

The green pressed disc was one inch in diameter, about 0.040 inch thick and had a density of 1.2 g/cc.

The disc was fired in oxygen at atmospheric pressure at 1650° C. for one hour and then furnace-cooled to room temperature to produce a gas-impermeable body.

The fired body, which was opaque, was sintered in air at atmospheric pressure at 1800° C. for 3 hours and then furnace-cooled to room temperature. The resulting sintered disc was approximately 0.075 inch in diameter and 0.030 inch thick.

The resulting sintered disc was optically translucent and would be useful in its as-sintered, non-polished condition as an envelope for an arc tube. When it was laid against newsprint, the print could be read by eye. Its optical translucency indicated that it was 100% dense and that the firing in oxygen had produced a gas-impermeable body.

The sintered disc was polished and etched substantially in the same manner disclosed in Example 5 to remove a substantial portion of the face of the disc to show its crosssectional microstructure. The etched surface is illustrated in FIG. 3 which shows a microstructure composed of elongated grains as well as equiaxed grains.

The optical translucency of this disc indicated that it was composed of single phase mullite. However, examination of its microstructure indicated that there was a small but insignificant amount of glassy phase present.

EXAMPLE 7

Aluminosilicate powder comprised of 75 wt % $Al_2O_3$/25% $SiO_2$ was prepared, calcined in air, and the calcined powder was pressed into a disc in substantially the same manner as set forth in Example 3 except that a pressure of 100,000 psi was used.

Two green pressed discs were produced, each one inch in diameter and about 0.040 inch thick, and each had a density of 1.3 g/cc.

The discs were fired in oxygen at atmospheric pressure at 1600° C. for one houre and then furnace cooled to room temperature to produce gas impermeable bodies.

These discs showed a shrinkage of 25%. They were white opaque, non-absorbent, i.e. gas impermeable, and had a displacement density of 3.11 g/cc. They were transferred to a gasfired furnace similar to a commercial industrial type furnace, and refired at 1820±25° C. for 2 hours, i.e., sintered in air at atmospheric pressure at 1820±25° C. for 2 hours.

Each of the resulting as-sintered, non-polished sintered discs was optically translucent and each would be useful as an envelope for an arc tube. Each of the sintered discs had a density of 3.16 g/cc and a light transmission equivalent to discs of the same composition which had been sintered in oxygen as set forth in copending application Ser. No. 381,821.

As used herein, transmission and transmittance are equivalent.

The following copending U.S. patent applications are assigned to the assignee hereof and are incorporated herein by reference and contain claims to the same product herein or cover the product herein:

Ser. No. 381,821 filed of even date herewith in the names of S. Prochazka and F. J. Flug entitled "OPTICALLY TRANSLUCENT MULLITE CERAMIC" discloses pressing amorphous mixed oxide powder composed of from about 74 weight % to about 76.5 weight % $Al_2O_3$ balance $SiO_2$ into a compact with a density of at least 1 g/cc, and sintering the compact in oxygen producing an optically translucent theoretically dense body of mullite.

Ser. No. 381,822 filed of even date herewith in the names of S. Prochazka and F. J. Klug entitled "OPTICALLY TRANSLUCENT CERAMIC" discloses optically translucent dense bodies by pressing amorphous mixed oxide powder composed of from about 72.5 weight % to about 76.5 weight % $Al_2O_3$ balance $SiO_2$ into a compact with a density of at least 1 g/cc sintering the pressed compact in oxygen or a vacuum of 0.05 torr to 1 torr to produce a compact impermeable to gas, hot isostatically pressing the sintered compact with a gas under superatmospheric pressure at elevated temperature to theoretical density, and with respect to compositions ranging from higher than about 74 wt % $Al_2O_3$/balance $SiO_2$, annealing the theoretically dense body.

What is claimed is:

1. A process for producing a polycrystalline mullite body optically translucent in the visible wave length which comprises providing an amorphous shapeless mixed oxide powder consisting essentially of from about 74 weight % to about 76.5 weight % $Al_2O_3$ balance $SiO_2$ with a surface area ranging from about 100 square meters per gram to about 400 square meters per gram and a bulk density ranging from about 0.2 g/cc to about 0.3 g/cc containing a significant amount of water, calcining said powder at a temperature ranging from about 490° C. to about 1100° C. to remove water and any organic material therefrom leaving no significant amount thereof producing an amorphous shapeless mixed oxide powder consisting essentially of from about 74 weight % to about 76.5 weight % $Al_2O_3$ balance $SiO_2$, said calcining having no significant effect on the oxide composition or morphology of said powder, said calcined powder being pressable at about room temperature into a compact having a minimum density of 1.0 g/cc, pressing said calcined powder into a compact having a minimum density of 1.0 g/cc, firing the compact at a temperature which has no significant deleterious effect on it in oxygen or in a vacuum ranging from about 0.05 torr to about 1 torr producing a gas-impermeable compact, and sintering said gas-impermeable compact in an atmosphere selected from the group consisting of air, argon, helium, nitrogen and mixtures thereof, at a temperature raging from about 1700° C. to about 1850° C. producing an optically translucent sintered body of theoretical density based on the density of 3.16 g/cc±0.01 or 3.17 g/cc±0.01 for said mullite body.

2. A process according to claim 1 wherein said $Al_2O_3$ ranges from about 74.5 weight % to about 75.5 weight %.

3. A process according to claim 1 wherein said compact is prefired to impart strength thereto in air, argon, helium, nitrogen, oxygen and mixtures thereof as well as a partial vacuum at a temperature ranging up to about 1500° C., said prefiring having no significant deleterious effect on said compact.

4. A process for producing a polycrystalline mullite body optically translucent in the visible wave length which comprises providing an amorphous shapeless mixed oxide powder consisting essentially of from about 74.5 weight % to about 75.5 weight % $Al_2O_3$ balance $SiO_2$ with a surface area ranging from about 200 square meters per gram to about 300 square meters per gram and a bulk density ranging from about 0.2 g/cc to about 0.3 g/cc containing a significant amount of water, calcining said powder at a temperature ranging from about 500° C. to 700° C. to remove water and any organic material therefrom producing an amorphous shapeless mixed oxide powder consisting essentially of from about 74.5 weight % to about 75.5 weight % $Al_2O_3$ balance $SiO_2$, said calcining having no significant effect on the oxide composition or morphology of said powder, said calcined powder being pressable at about room temperature into a compact having a minimum density of 1.0 g/cc, pressing said calcined powder into a compact having a minimum density of 1.0 g/cc, firing the compact at a temperature which has no significant deleterious effect on it ranging from about 1500° C. to about 1675° C. in oxygen or in a vacuum ranging from about 0.05 torr to about 1 torr producing a gas-impermeable compact, said sintering said gas-impermeable compact in an atmosphere selected from the group consisting of air, argon, helium, nitrogen and mixtures thereof, at a temperature ranging from about 1700° C. to about 1850° C. producing an optically translucent sintered body of theoretical density based on the density of 3.16 g/cc±0.01 or 3.17 g/cc±0.01 for said mullite body.

* * * * *